(12) United States Patent
Saga

(10) Patent No.: US 8,029,694 B2
(45) Date of Patent: Oct. 4, 2011

(54) THERMALLY CONDUCTIVE AND ELECTRICALLY RESISTIVE LIQUID CRYSTALLINE POLYMER COMPOSITION

(75) Inventor: Yuji Saga, Tochigi (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 539 days.

(21) Appl. No.: 12/148,906

(22) Filed: Apr. 23, 2008

(65) Prior Publication Data

US 2008/0265202 A1    Oct. 30, 2008

Related U.S. Application Data

(60) Provisional application No. 60/925,926, filed on Apr. 24, 2007.

(51) Int. Cl.
| | |
|---|---|
| *C09K 19/00* | (2006.01) |
| *C09K 19/06* | (2006.01) |
| *C09K 19/52* | (2006.01) |
| *G02F 1/13* | (2006.01) |

(52) U.S. Cl. .... 252/299.01; 252/67; 430/20; 430/270.1; 349/182

(58) Field of Classification Search .................... 252/67, 252/299.01; 430/20, 270.1; 349/182
See application file for complete search history.

(56) References Cited

U.S. PATENT DOCUMENTS

| | | | |
|---|---|---|---|
| 6,995,205 B2 | 2/2006 | Matsukawa et al. | |
| 2008/0048150 A1 * | 2/2008 | Hosoda et al. | ............. 252/299.5 |

OTHER PUBLICATIONS

Japanese Abstract, JP 2003-301107, Toray Ind. Inc.
Japanese Abstract, JP 2003-327836, Mitsubishi Gas Chem Co. Inc.

* cited by examiner

*Primary Examiner* — Geraldina Visconti

(57) ABSTRACT

A thermally conductive polymer composition comprising liquid crystalline polymer; metal alloy having a melting point of between about 200° C. and about 500° C.; and thermally conductive filler other than the metal alloy. The composition has a volume resistivity of at least about $1 \times 10^{13}$ Ω·cm and a thermal conductivity of at least about 0.7 W/m·K.

18 Claims, No Drawings

THERMALLY CONDUCTIVE AND ELECTRICALLY RESISTIVE LIQUID CRYSTALLINE POLYMER COMPOSITION

CROSS REFERENCE TO RELATED APPLICATIONS

This application claims the benefit of priority to U.S. Provisional Application No. 60/925,926, filed Apr. 24, 2007.

FIELD OF THE INVENTION

The present invention relates to thermally conductive, electrically insulative liquid crystalline polymer compositions.

BACKGROUND OF THE INVENTION

Many electrical and electronic devices generate heat during operation and as microprocessors have gotten faster, their semiconductor elements have become smaller and more densely packed. The resulting increased amounts they generate of heat can lead to device failure and shorted lifetimes. Therefore, ever-increasingly more efficient methods of cooling semiconductor components are needed. Components such as heat sinks, heat conductive sheets, heat pipes, water coolers, fans etc. are often used to transfer heat away from its source. Heat sinks, for example, are often made from metals or ceramics having high thermal conductivities, but these can be bulky.

It would be desirable to be able to make cooling components from polymeric materials, as many such materials can be easily formed into a variety of shapes, including those having intricate designs, and a variety of sizes, including the very small sizes needed in many cases. Furthermore, since many housings for circuit boards and other components are made from polymeric materials, it would be desirable to be able to use thermally conductive polymeric materials for these applications, as the housing could then dissipate the heat generated by the electrical or electronic component, thus obviating the need for additional bulky heat sinks. However, in such applications it is frequently desirable that the polymeric material be electrically resistive (i.e., electrically insulating).

In order to obtain a highly thermally conductive resin, many thermally conductive polymer additives, such as ceramics, must often be used at high loadings, which can lead to increased costs and diminished physical properties of the resulting composition. Other additives such as graphite or carbon fibers can improve thermal conductivities when used in polymeric compositions, but can also increase the electrical conductivity of the compositions.

It would thus be desirable to obtain a polymer composition that is both thermally conductive and electrically insulating that that has good physical properties.

JP H06-196884 A discloses resin compositions comprising a filler (such as a metal, alloy, or ceramic) having a high thermal conductivity dispersed in a matrix resin. The composition further comprises a low-melting-point metal alloy. When an article comprising the composition is heated at a temperature at which the low-melting-point metal alloy is completely melted, the alloy is fused with the filler particles, cross-linking them.

JP 2003-301107 A discloses a composition containing 100 to 700 parts by weight metal oxide and 100 parts by weight of a resin mixture containing (a) 60-95 weight percent poly(arylene sulfide) resin and (b) 5-40 weight percent of an amorphous thermoplastic resin having a glass transition temperature of 140° C. or higher. The composition may further contain 15-100 parts by weight fibrous filler per 100 parts by weight of resin mixture. The composition has excellent thermal conductivity, low burring, excellent melt fluidity, and excellent heat resistance.

JP 2003-327836 A discloses a thermally conductive resin material containing carbon fibers and a matrix resin. The carbon fibers are formed by melting and spinning a mesophase pitch having specific properties and subsequently insolubilizing, carbonizing, and graphitizing the fiber. The composition has excellent moldability, mechanical performance, antistatic properties, and electromagnetic shielding properties.

WO 03/029352 and U.S. Pat. No. 6,995,205 B2 disclose a highly thermally conductive resin composition having a high thermal conductivity and good moldability. The composition comprises at least 40 volume percent of a matrix resin, 10-55 volume percent of a thermally conductive filler, and a metal alloy having a melting of 500° C. or less that binds the thermally conductive filler particles to each other. The volume ratio of the metal alloy and thermally conductive filler ranges from 1:30 to 3:1.

SUMMARY OF THE INVENTION

There is disclosed and claimed herein a thermally conductive polymer composition, comprising:
  (a) about 75 to about 98.7 volume percent of at least one liquid crystalline polymer;
  (b) about 0.3 to about 15 volume percent of at least one metal alloy having a melting point of between about 200° C. and about 500° C.; and
  (c) about 1 to about 10 volume percent of at least one thermally conductive filler other than a metal alloy having a melting point of between about 200° C. and about 500° C.,
  wherein the volume percentages are based on the total volume of the composition, and wherein the composition has a volume resistivity of at least about $1 \times 10^{13}$ Ω·cm and a thermal conductivity of at least about 0.7 W/m·K.

DETAILED DESCRIPTION OF THE INVENTION

It has been surprising discovered that a composition comprising at least one liquid crystalline polymer and a thermally conductive filler, where the thermally conductive filler comprises at least one metal alloy having a melting point of between about 200 and 500° C. and at least one electrically insulating and thermally conductive filler and/or at least one electrically conductive thermally conductive fillers other than the aforementioned metal alloy has good thermal conductivity and high electrical resistivity.

By a "liquid crystalline polymer" (abbreviated "LCP") is meant a polymer that is anisotropic when tested using the TOT test or any reasonable variation thereof, as described in U.S. Pat. No. 4,118,372, which is hereby included by reference. Useful LCP's include polyesters, poly(ester-amides), and poly(ester-imides). One preferred form of LCP is "all aromatic", that is all of the groups in the polymer main chain are aromatic (except for the linking groups such as ester groups), but side groups that are not aromatic may be present.

The LCP's are typically derived from monomers that include aromatic hydroxycarboxylic acids, aromatic dicarboxylic acids, aliphatic dicarboxylic acids, aromatic diols, aliphatic diols, aromatic hydroxyamines, and aromatic diamines. For example, they may be aromatic polyesters that are obtained by polymerizing one or two or more aromatic hydroxycarboxylic acids; aromatic polyesters obtained by polymerizing aromatic dicarboxylic acids, one or two or more aliphatic dicarboxylic acids, aromatic diols, and one or two or more aliphatic diols, or aromatic hydroxycarboxylic acids; aromatic polyesters obtained by polymerizing one or two or more monomers selected from a group including aromatic dicarboxylic acids, aliphatic dicarboxylic acids, aromatic diols, and aliphatic diols, aromatic polyester amides obtained by polymerizing aromatic hydroxyamines, one or two or more aromatic diamines, and one or two or more aromatic hydroxycarboxylic acids; aromatic polyester amides obtained by polymerizing aromatic hydroxyamines, one or two or more aromatic diamines, one or two or more aromatic hydroxycarboxylic acids, aromatic dicarboxylic acids, and one or two or more aliphatic carboxylic acids; and aromatic polyester amides obtained by polymerizing aromatic hydroxyamines, one or two or more aromatic diamines, one or two or more aromatic hydroxycarboxylic acids, aromatic dicarboxylic acids, one or two or more aliphatic carboxylic acids, aromatic diols, and one or two or more aliphatic diols.

Examples of aromatic hydroxycarboxylic acids include 4-hydroxybenzoic acid, 3-hydroxybenzoic acid, 2-hydroxybenzoic acid, 6-hydroxy-2-naphthoic acid, and halogen-, alkyl-, or allyl-substituted derivatives of hydroxybenzoic acid.

Examples of aromatic dicarboxylic acids include terephthalic acid; isophthalic acid; 3,3'-diphenyl dicarboxylic acid; 4,4'-diphenyl dicarboxylic acid; 1,4-naphthalene dicarboxylic acid; 1,5-naphthalene dicarboxylic acid; 2,6-naphthalene dicarboxylic acid; and alkyl- or halogen-substituted aromatic dicarboxylic acids, such as t-butylterephthalic acid, chloroterephthalic acid, etc.

Examples of aliphatic dicarboxylic acids include cyclic aliphatic dicarboxylic acids; such as trans-1,4-cyclohexane dicarboxylic acid; cis-1,4-cyclohexane dicarboxylic acid; 1,3-cyclohexane dicarboxylic acid; and substituted derivatives thereof.

Examples of aromatic diols include hydroquinone; biphenol; 4,4'-dihydroxydiphenyl ether; 3,4'-dihydroxydiphenyl ether; bisphenol A; 3,4'-dihydroxydiphenylmethane; 3,3'-dihydroxydiphenylmethane; 4,4'-dihydroxydiphenylsulfone; 3,4'-dihydroxydiphenylsulfone; 4,4'-dihydroxydiphenylsulfide; 3,4'-dihydroxdiphenylsulfide; 2,6'-naphthalenediol; 1,6'-naphthalenediol; 4,4'-dihydroxybenzophenone; 3,4'-dihydroxybenzophenone; 3,3'-dihydroxybenzophenone; 4,4'-dihydroxydiphenyldimethylsilane; and alkyl- and halogen-substituted derivatives thereof.

Examples of aliphatic diols include cyclic, linear, and branched aliphatic diols, such as trans-1,4-hexanediol; cis-1, 4-hexanediol; trans-1,3-cyclohexanediol; cis-1,2-cyclohexanediol; ethylene glycol; 1,4-butanediol; 1,6-hexanediol; 1,8-octanediol; trans-1,4-cyclohexanedimethanol; cis-1,4-cyclohexanedimethanol; etc., and substituted derivatives thereof.

Examples of aromatic hydroxyamines and aromatic diamines include 4-aminophenol, 3-aminophenol, p-phenylenediamine, m-phenylenediamine, and substituted derivatives thereof.

The LCP's may be produced using any method known in the art. For example, they can be produced by standard polycondensation techniques (melt polymerization, solution polymerization, and solid-phase polymerization). It is desirable for them to be produced in an inert gas atmosphere under anhydrous conditions. For example, in the melt acidolysis method, the necessary quantities of acetic anhydride, 4-hydroxybenzoic acid, diol, and terephthalic acid are stirred, after which they are heated in a reaction vessel provided with a combination of a nitrogen introduction tube and a distillation head or cooler; the side reaction products, such as acetic acid, are removed through the distillation head or cooler, after which they are collected. After the quantity of collected side reaction products becomes constant, and the polymerization is almost completed, the melted lump is heated under a vacuum (ordinarily, 10 mmHg or lower) and the remaining side reaction products are removed, completing the polymerization.

The liquid crystal polymers typically have number average molecular weights in the range of about 2,000 to about 200,000, or more preferably about 5,000 to about 50,000, or yet more preferably about 10,000 to about 20,000.

Polyesters that contain repeat units derived from hydroquinone; 4,4'-dihydroxybiphenyl; terephthalic acid; 2,6-naphthalene dicarboxylic acid; and 4-hydroxybenzoic acid in these liquid crystal polymers are ideal for use in this invention. In particular, they are liquid crystal polyesters comprising the following repeat units:

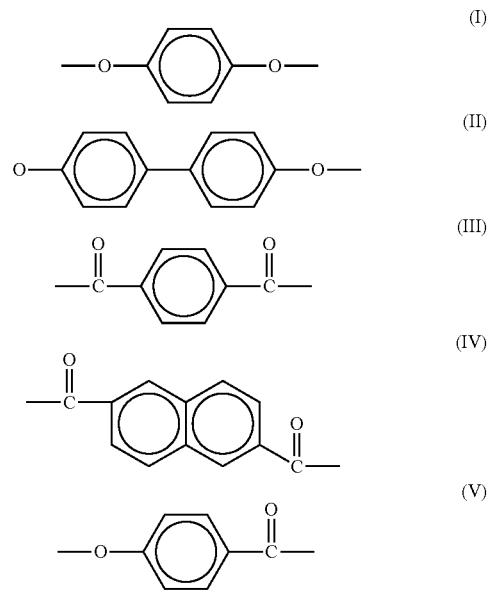

wherein the molar ratio (I):(II) is in the range of about 65:35 to about 40:60, the molar ratio (III):(IV) is in the range of about 85:15 to about 50:50, the molar ratio of the sum of (I) and (II) to the sum of (III) and (IV) is essentially 1:1, and about 200 to about 600 moles of (V) are present per 100 moles of (I)+(II).

The LCP is present in the composition in about 75 to about 98.7 volume percent, or preferably about 77 to about 97.4 volume percent, or more preferably about 80 to about 96 volume percent, based on the total volume of the composition.

The thermally conductive filler comprises (i) at least one metal alloy having a melting point of between about 200 and about 500° C. and (ii) at least one thermally conductive filler other than a metal alloy having a melting point of between about 200 and 500° C.

Component (i) of the thermally conductive filler is present in about 0.3 to about 15 volume percent, or preferably about 0.6 to about 13 volume percent, or more preferably about 1 to about 10 volume percent, based on the total volume of the composition.

Component (ii) of the thermally conductive filler is present in about 1 to about 10 volume percent, or preferably about 2 to about 10 volume percent, or more preferably about 3 to about 10 volume percent, based on the total volume of the composition.

By "thermally conductive" is meant that the fillers have a thermal conductivity of at least about 5 W/mK, or preferably at least about 50 W/mK, or more preferably 185 W/mK The metal alloy has a melting point of between about 200° C. and about 500° C., or preferably between about 200° C. and about 400° C. It is preferred that the metal alloy be selected to be in a semi-molten state in which solid and liquid phases coexist at the melting temperature of the polymer.

Examples of metal alloys include Sn alloys such as Sn—Cu, Sn—Al, Sn—Zn, Sn—Te, Sn—Pt, Su—P, Sn—Mn, Sn—Ag, Sn—Ca, Sn—Mg, Sn—Au, Sn—Ba, and Sn—Ge; and Li alloys such as Al—Li, Cu—Li, and Zn—Li. Preferred alloys having melt points (i.e., liquid-phase-line temperatures of 400° C. or lower) include Sn—Cu, Sn—Al, Sn—Zn, Sn—Pt, Sn—Mn, Sn—Ag, Sn—Au, Al—Li, and Zn—Li. More preferred are Sn—Cu, Sn—Al, and Sn—Zn, which are easily obtainable and low in cost. It is even more preferable to use Sn—Cu alloys, as they are available with a range of melting points and have high thermal conductivities.

The thermally conductive fillers other than the metal alloy are preferably in the form of powders or fibers. One or more fillers may be used. Examples of suitable powdered or fibrous fillers include metal powders or fibers such as iron, copper, tin, nickel, aluminum, magnesium, titanium, chromium, zinc, gold, silver, etc. ceramic powders such as aluminum oxide, magnesium oxide, boron nitride, aluminum nitride, silicon nitride, calcium fluoride, zinc oxide, ceramic fibers such as alumina fibers, calcium titanate fibers, and silicon nitride fibers, powders or fibers, as well as graphite powder or fiber.

A preferred thermally conductive filler is a combination of copper powder and graphite powder. When compositions using this combination are prepared, the copper and graphite may be added separately to the other components. Alternatively, they may be formed into a compound that is then added to the other components of the composition. Examples of suitable copper-graphite compound powders may be a graphite powder coated with copper; or a graphite powder plated with copper powder by electrolytic or non-electrolytic plating; or a composite of graphite and copper powders produced by mechanical alloying. The particle diameters of the composite copper-graphite powder are preferably in the range of about 1 to about 150 μm or more preferably about 25 to about 100 μm, since the powder can be hard to disperse in the matrix resin if the particle diameters are smaller than 1 μm, or greater than 150 μm. The ratio of copper to graphite in the compound is preferably between about 1:30 and 3:1.

The following advantages may be obtained by using a composite copper-graphite powder. Copper powder has a relatively high thermal conductivity among metals, but its specific gravity is high. Therefore, by compounding it with graphite powder, which has a low specific gravity, a powder with a low specific gravity and a high thermal conductivity can be obtained. Furthermore, graphite is often not easily oxidized even under conditions that can oxidize copper; therefore, the reduction of the thermal conductivity of the composite powder through oxidation can be kept to a minimum. In addition, since the copper is in the form of a plated film when graphite powder plated with copper powder is used, and hence the compound may not have the ductility of pure copper, the composite copper-graphite powder can also have the effect of decreasing the deformation of the copper during injection molding and reducing the amount of torque needed during molding.

Furthermore, the surfaces of the thermally conductive fillers can be modified with coupling agents or sizing agents that can improve compatibility with the LCP. Such agents can improve the dispersability of the thermally conductive filler within the resin thus can improve the thermal conductivity of the composition. Suitable coupling agents include those known in the art, such silane, titanium, or aluminum coupling agents. For example, one can use isopropyl triisostearoyl titanate and acetalkoxyaluminum diisopropylate. Examples of suitable sizing agents include epoxy, urethane-modified epoxy, polyurethane, and polyamide resins. The modification can be performed by immersing the thermally conductive filler for a specific time in a solution of the coupling agent dissolved in water or an organic solvent, or by spraying a solution of the coupling agent on the thermally conductive filler.

The composition of this invention may optionally contain one or more additional fillers such as glass fibers, talc, mica, kaolin, wollastonite, calcium carbonate. The optional fillers may be present in 0 to about 30 volume percent, or more preferably, in about 3 to about 30 volume percent, based on the total volume of the composition.

The composition may further contain additional additives such as heat stabilizers, ultraviolet ray absorbents, antioxidants, lubricants, nucleating agents, anti-static agents, mold release agents, colorants (such as dyes and pigments), flame retardants, plasticizers, other resins, and the like. Such additives will typically be present in total in up to about 30 volume percent, based on the total volume of the composition.

The composition has a thermal conductivity of at least about 0.7 W/m·K, or preferably at least about 1 W/m·K, or more preferably at least about 1.5 W/m·K. Thermal conductivity is measured using to a laser flash method in the machine direction (i.e., the direction along which the carbon fibers are oriented).

The composition has a volume resistivity of at least about $1 \times 10^{13}$ Ω·cm. Electrical volume resistivity is measured according to JIS K6911

The composition of the present invention is in the form of a melt-mixed blend, wherein all of the polymeric components are well-dispersed within each other and all of the non-polymeric ingredients are dispersed in and bound by the polymer matrix, such that the blend forms a unified whole. The blend may be obtained by combining the component materials using any melt-mixing method. The component materials may be mixed using a melt-mixer such as a single- or twin-screw extruder, blender, kneader, roller, Banbury mixer, etc. to give a resin composition. Or, part of the materials may be mixed in a melt-mixer, and the rest of the materials may then be added and further melt-mixed. The sequence of mixing in the manufacture of the compositions of the invention may be such that individual components may be melted in one shot, or the filler and/or other components may be fed from a side feeder, and the like, as will be understood by those skilled in the art.

The processing temperature used for the melt-mixing process is selected such that the polymer is molten and the metal alloy is in a semi-molten state in which solid and liquid phases coexist.

The compositions of the present invention may be formed into articles using methods known to those skilled in the art, such as, for example, injection molding, extrusion, blow molding, injection blow molding, compression molding, foaming molding, extrusion, vacuum molding, rotation molding, calendar molding, solution casting, or the like.

The compositions of the present invention may be used as components in composite articles. The composite articles may be formed, by example, by overmolding the composition onto other articles, such as polymeric articles or articles made from other materials. The composite articles may be multi-layered, comprising additional layers comprising other materials and the composition of the present invention may be bonded to two or more layers or components.

PBT is poly(butylene terephthalate) (Crastin® 6131, supplied by E.I. du Pont de Nemours and Co.)

Polyamide 6,6 is Zytel® 101, supplied by E.I. du Pont de Nemours and Co.

Graphite is CB-150, supplied by Nippon Graphite Industries, Ltd.

Glass fibers are Vetrotex® 910, supplied by NSG-Vetrotex Co.

Metal alloy is a Sn—Cu alloy having a melting point of 230° C. and a mean particle diameter of 15.5 μm.

TABLE 1

|  | Example 1 | Comp. Ex. 1 | Comp. Ex. 2 | Comp. Ex. 3 | Example 2 | Example 3 | Example 4 | Comp. Ex. 4 |
|---|---|---|---|---|---|---|---|---|
| LCP A | — | — | — | — | 85.7 | 89.3 | — | — |
| LCP B | 90.5 | — | — | — | — | — | 83.7 | 60.6 |
| Polyamide 6,6 | — | 90.5 | — | — | — | — | — | — |
| PBT | — | — | 90.5 | 76.7 | — | — | — | — |
| Metal alloy (A) | 2.4 | 2.4 | 2.4 | 2.9 | 1.7 | 1.7 | 0.8 | 6.9 |
| Copper powder (B1) | 1.4 | 1.4 | 1.4 | 1.8 | 1.0 | 1.0 | 0.5 | 4.2 |
| Graphite (B2) | 5.7 | 5.7 | 5.7 | 7.7 | 8.3 | 8.0 | 1.9 | 13.9 |
| Glass fibers | — | — | — | 10.9 | 3.3 | — | 13.1 | 14.4 |
| Total amount of thermally conductive fillers (B) (vol. %) | 7.1 | 7.1 | 7.1 | 9.5 | 9.3 | 9.0 | 2.4 | 18.1 |
| Ratio of metal alloy (A) to thermally conductive fillers (B) (vol./vol.) | 1/3 | 1/3 | 1/3 | 1/3 | 1/5 | 1/5 | 1/3 | 1/3 |
| Thermal conductivity (W/m · K) | 1.7 | 1.3 | 2.2 | 1.9 | 2.2 | 2 | 0.9 | 3.9 |
| Volume resistivity (Ω · cm) | $>10^{14}$ | $5 \times 10^{10}$ | $3 \times 10^{6}$ | $2 \times 10^{6}$ | $>10^{14}$ | $>10^{14}$ | $>10^{14}$ | 50 |

Ingredient quantities are given in volume percent based on the total volume of the composition.

The articles may include housings for electronic parts, heat sinks, fans, and other devices used to convey heat away from electronic components. The articles may include optical pickup bases, which are heat-radiating bodies enclosing semiconductor lasers in optical pickups; packaging and heat sink materials for semiconductor elements; casings of fan motors; motor core housings; secondary battery casings; personal computer and mobile telephone housings, etc.

The compositions of the present invention have been surprisingly been discovered to have good thermal conductivity and high electrical resistivity.

EXAMPLES

The compositions of Examples 1-4 and Comparative Examples 1-4 were prepared by melt blending the ingredients shown in Table 1 in a kneading extruder at temperatures of about 350-370° C. for Examples 1-4 and Comparative Example 4, about 300-330° C. for Comparative Example 1, and about 280-310° C. for Comparative Examples 2-3. Upon exiting the extruder, the compositions were cooled and pelletized. The resulting compositions were injection molded into test pieces having dimensions 0.8 mm×50 mm×50 mm for electrical volume resistivity measurements and were hot press molded into test pieces having dimensions of 50 mm in diameter and 5 mm in thickness for thermal conductivity measurements.

Thermal conductivity was measured in the machine direction using a laser flash method. The results are shown in Table 1.

Volume resistivity was measured according to JIS K6911. The results are shown in Table 1.

The following ingredients are shown in Table 1:

LCP A is Zenite® 7000 supplied by E.I. du Pont de Nemours and Co.

LCP B is Zenite® 6000 supplied by E.I. du Pont de Nemours and Co.

What is claimed is:

1. A thermally conductive polymer composition, comprising:
   (a) about 75 to about 98.7 volume percent of at least one liquid crystalline polymer;
   (b) about 0.3 to about 15 volume percent of at least one metal alloy having a melting point of between about 200° C. and about 500° C.; and
   (c) at least 1 but less than 10 volume percent of at least one thermally conductive filler other than a metal alloy having a melting point of between about 200° C. and about 500° C., wherein the volume percentages are based on the total volume of the composition, and wherein the composition has a volume resistivity of greater than $1 \times 10^{14} \Omega \cdot \text{cm}$ and a thermal conductivity of at least about 0.7 W/m·K.

2. The composition of claim 1, wherein the metal alloy is at least one of Sn—Cu, Sn—Al, Sn—Zn, Sn—Te, Sn—Pt, Su—P, Sn—Mn, Sn—Ag, Sn—Ca, Sn—Mg, Sn—Au, Sn—Ba, Sn—Ge, Al—Li, Cu—Li, and Zn—Li.

3. The composition of claim 1, wherein at least one metal alloy has a melting point of between about 200° C. and about 400° C.

4. The composition of claim 1, wherein the thermally conductive filler comprises at least one metal powder and/or fiber.

5. The composition of claim 4, wherein the metal powder and/or fiber comprises at least one of iron, copper, tin, nickel, aluminum, magnesium, titanium, chromium, zinc, gold, and silver.

6. The composition of claim 1, wherein the thermally conductive filler comprises at least one ceramic powder.

7. The composition of claim 6, wherein the ceramic powder is one or more selected from the group consisting of aluminum oxide, magnesium oxide, boron nitride, aluminum nitride, silicon nitride, calcium fluoride, and zinc oxide.

8. The composition of claim 1, wherein the thermally conductive filler comprises at least one ceramic fiber.

9. The composition of claim 8, wherein the ceramic fiber is one or more selected from the group consisting of alumina fibers, calcium titanate fibers, and silicon nitride fibers.

10. The composition of claim 1, wherein the thermally conductive filler comprises graphite powder and/or graphite fiber.

11. The composition of claim 1, wherein the thermally conductive filler comprises copper powder and graphite.

12. The composition of claim 1, further comprising one or more of glass fibers, talc, kaolin, wollastonite, and calcium carbonate.

13. The composition of claim 1, wherein the composition has a thermal conductivity of at least about 1 W/m·K.

14. The composition of claim 1, wherein the composition has a thermal conductivity of at least about 1.5 W/m·K.

15. An article comprising the composition of claim 1.

16. The article of claim 15 in the form of a composite article.

17. The article of claim 15 in the form of a housing for electronic parts, a heat sink, an optical pickup base, or a fan.

18. The article of claim 15 in the form of a fan motor housing, a motor core housing, a secondary battery casing, a personal computer housing, or a mobile telephone housing.

* * * * *